United States Patent [19]
Ogino

[11] Patent Number: 5,089,896
[45] Date of Patent: Feb. 18, 1992

[54] COLOR DEVIATION PREVENTION DEVICE IN PROJECTION DISPLAY WITH MINIMIZED WHITE CHROMATICITY DEVIATION

[75] Inventor: Masanori Ogino, Yokohama, Japan
[73] Assignee: Hitachi, Ltd., Tokyo, Japan
[21] Appl. No.: 426,048
[22] Filed: Oct. 24, 1989

[30] Foreign Application Priority Data

Oct. 31, 1988 [JP] Japan .................. 63-273121

[51] Int. Cl.⁵ .................. H04N 5/72; H04N 5/74
[52] U.S. Cl. .................. 358/239; 358/237; 356/402
[58] Field of Search .......... 350/432, 412; 356/402; 358/231, 238, 239, 64, 237, 60; 353/30, 31

[56] References Cited

U.S. PATENT DOCUMENTS

| | | | |
|---|---|---|---|
| 3,896,338 | 7/1975 | Nathanson et al. | 358/231 |
| 4,032,968 | 6/1977 | Miyoshi et al. | 358/239 |
| 4,210,928 | 7/1980 | Ohmori et al. | 358/60 |
| 4,376,949 | 3/1983 | Rowe | 358/237 |
| 4,400,722 | 8/1983 | Miyatake et al. | 358/60 |
| 4,499,486 | 2/1985 | Favreau et al. | 358/37 |
| 4,633,301 | 12/1986 | Saitoh | 356/402 |
| 4,672,458 | 6/1987 | McKechnie | 358/231 |
| 4,714,956 | 12/1987 | Yin | 358/231 |
| 4,746,970 | 4/1988 | Hosokawa et al. | 358/64 |
| 4,766,498 | 8/1988 | Spruit | 358/64 |
| 4,883,360 | 11/1989 | Kawada et al. | 356/402 |
| 4,914,510 | 4/1990 | Brennesholtz et al. | 358/64 |
| 5,010,397 | 4/1991 | Hasegawa | 358/231 |

FOREIGN PATENT DOCUMENTS

| | | |
|---|---|---|
| 61-29198 | 5/1978 | Japan . |
| 0159686 | 12/1980 | Japan .................. 358/64 |
| 0123589 | 11/1987 | Japan . |
| 0037896 | 2/1990 | Japan . |

Primary Examiner—James J. Groody
Assistant Examiner—Jeffrey S. Murrell
Attorney, Agent, or Firm—Antonelli, Terry, Stout & Kraus

[57] ABSTRACT

A projection display of the type which projects the respective images emitted from a plurality of tubes on a rectangular screen through lenses arranged correspondingly to the projection tubes, thereby to compose the images by overlapping, wherein the lenses are arranged so that the optical axis is located on the center line substantially bisecting the angle at which the pupil of each of the lenses sees both side ends of the rectangular screen with an equal angle, and wherein there is provided an arrangement for optically or electrically correcting relative deviations in the amounts of light projected from the lenses.

10 Claims, 7 Drawing Sheets

COLOR DEVIATION PREVENTION DEVICE IN PROJECTION DISPLAY WITH MINIMIZED WHITE CHROMATICITY DEVIATION

BACKGROUND OF THE INVENTION

The present invention relates to a projection display, and more particularly to a device for preventing white chromaticity deviation (color deviation) in a projection display which projects the respective images emitted from tubes of projecting monochromes such as red, green and blue on a rectangular screen through lenses arranged correspondingly to the projection tubes, thereby to compose the images by overlapping.

If in the projection display of this type, the light amounts projected from the respective monochrome projection tubes through the lenses are equal at an optional position (spot) of the screen, a white image will appear at the spot, but a color deviation means that a color other than white will appear at such spot.

Owing to relative positions where the monochrome projection tubes for red, green and blue are arranged, however, the light amounts coming from the respective monochrome projection tube are not actually equal at some position (spot). For example, if at the spot in issue, the amount of red light from the red projection tube is more than that from the other projection tube (green or blue), a reddish color which should be naturally white will appear at the spot. This means that "color deviation" (hereinafter referred to as white chromaticity deviation as the case may be) will occur. Likewise, if at the spot in issue, the amount of blue light from the blue projection tube is more than that from the other projection tube (green or red), a bluish color which should be naturally white will appear at the position. This also results in occurrence of "color deviation" (white chromaticity deviation). Such a phenomenon is that although white images should uniformly appear on a screen, reddish or bluish images appear at some position (spot); it, therefore, provides poor color rendition and hence deteriorates the resultant image quality.

The present invention is directed to a projection display can decrease such white chromaticity deviation and so enhance color fidelity.

An optical system of the projection display disclosed in JP-A-61-29189 is shown in FIG. 2 in its horizontal-section. In FIG. 2, items 1, 2 and 3 are projection tubes corresponding to red, green and blue, respectively. Items 4, 5 and 6 are projection lenses corresponding to the tubes 1, 2 and 3, respectively. Item 7 is a screen. The respective projection tubes are arranged in parallel with each other and also the respectivee lenses are arranged in parallel with each other. Such an arrangement is advantageous in that color misregistration does not occur as long as geometrical distortion of the lenses is negligibly small.

The field angle by which the green lens 5 sees the screen 7 is symmetrical with respect to its optical axis as indicated for the right and left ends of the screen in FIG. 2. On the other hand, the field angles at which each of the red and blue projection lenses 4 and 6 sees the screen 7 are asymmetrical for the ends of the screen as indicated as (large and small) since the direction of the light advancing from the pupil of the lens to the center of the screen 7 deviates by a convergence angle positively or negatively from that in the green projection lens 5.

The light transmission of a projection lens generally deteriorates according as its field angle increases. In the optical system of FIG. 2, therefore, at the right end of the screen, the amount of light coming from the red lens 4 is more than that coming from the other lenses; as a result, although the spot in issue should be white as long as the light amount coming from any projection lens is equal, the spot deviates to be reddish. Likewise, at the left end of the screen, the spot which should be white deviates to be bluish.

In order to correct the white deviation that the spot to be white deviates to the other color, it is proposed in JP-A-61-29181 to previously modulate the amounts of electron beams in red and blue projection tubes in the horizontal direction with no necessity of modulating them in the vertical direction.

In the ordinary optical system in which deviation in the field angle indicated in FIG. 2 exceeds about 0.1 rad (radian), however, the amount to be corrected is too large and hence the residual deviation cannot be disregarded. Moreover, in such an optical system, the field angle of red or blue is too large at one of the right and left ends and hence the focusing performance of the lenses will deteriorate.

SUMMARY OF THE INVENTION

An object of the present invention is to provide a projection display which can considerably reduce the white chromaticity deviation on a screen without deteriorating the focusing performance.

The above object can be achieved by a projection display of the type which projects the respective images emitted from a plurality of tubes on a rectangular screen through lenses arranged correspondingly to the projection tubes, thereby to compose the images by overlapping, wherein the lenses are arranged so that the optical axis are located on the center line substantially bisecting the angle at which the pupil of each of the lenses sees both left and right side ends of the screen rectangular with equal angles, thereby preventing white chromaticity deviation from occurring at at least the side ends of the screen, and wherein there is provided means for correcting relative deviations in the amounts of light projected from the lenses at at least diagonal corners on the screen, thereby preventing the white chromaticity deviation from occurring at the diagonal corners.

The reason why the lenses are arranged as above is that the field angles of all the lenses for red, green and blue can be made qual at side ends and hence the light transmission efficiencies of the lenses can be made also equal; the amounts of light coming from the respective lenses can be made equal, and white uniformity can be obtained at at least the side ends of the screen so that white chromaticity deviation does not occur there. However, at the portions otehr than the side ends on the screen, the field angles formed by the beams of light projected from the lenses and the respective optical axes are not necessarily equal for the respective lenses which causes imbalance in the amounts of light coming from the lenses and so white chromaticity deviation occurs. This is the reason for providing the means for correcting the imbalance in he amounts of light coming from the lenses at diagonal corners of the screen.

BRIEF DESCRIPTION OF THE DRAWINGS

FIG. 3 is a map showing the distribution of white chromaticity deviation on a screen;

FIG. 4 is a view showing the shape of initial geometrical distortion on the screen;

FIG. 5 is a characteristic graph of the field angle of a lens vs. the relative amount of light;

DESCRIPTION OF THE PREFERRED EMBODIMENTS

Figure 1:
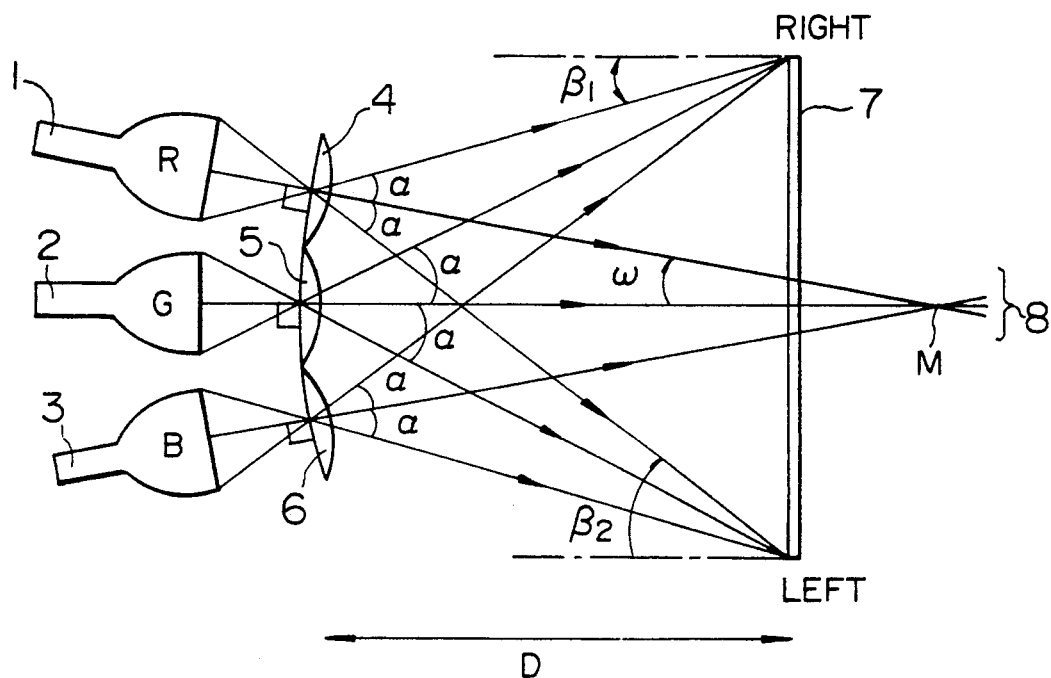
FIG. 1 is a schematic view showing a horizontal sectional view of the optical system of a projection display according to the presen tinvention.

The basic arrangement of an optical system according to the present invention is shown in FIG. 1 in its horizontal section. In FIG. 1, items 1, 2 and 3 are projection tubes for red, green and blue, respectively; items 4, 5 and 6 are projection lenses; item 7 is a screen; and item 8 are optical axes of the lenses.

D is a projection distance, i.e. a distance between the exiting pupil of a lens and the screen 7. H is a half width of the screen. $\omega$ is a convergence angle of the optical axes of the lenses (it should be noted that the convergence point is not located on the screen 7 but is located behind it). $\alpha$ is a field angle of each lens for the right and left side ends of the screen.

The value of $\omega$ is selected in accordance with $$\omega \approx \omega_0 \cos^2 \alpha \tag{1}$$

$$\tan \omega_o = \frac{W}{D}$$

Figure 2:
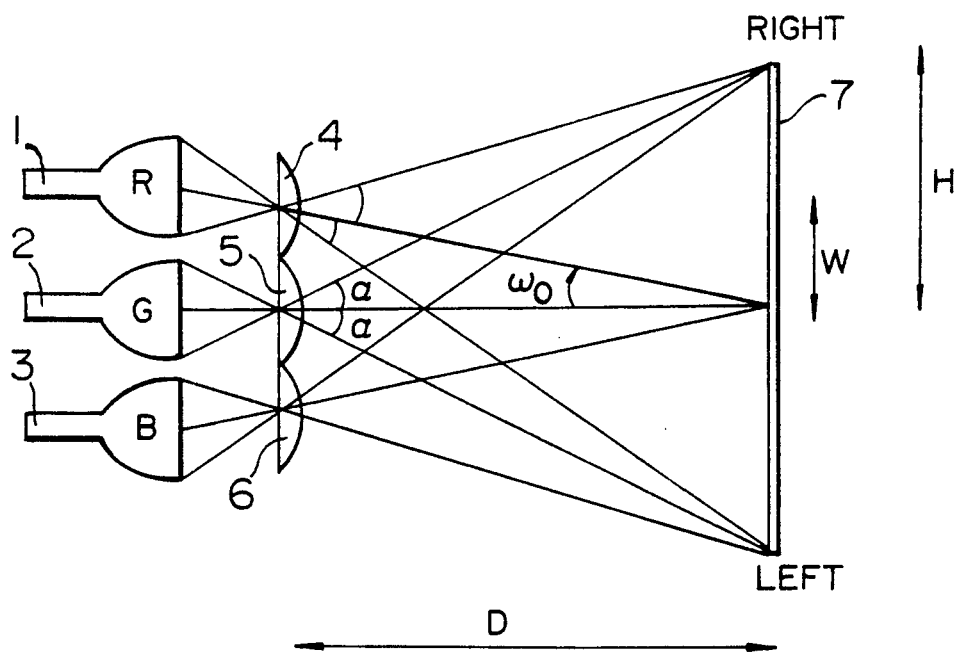
FIG. 2 is a view showing the schematic optical system of a projection display according to the prior art.

W: lens interval (see FIG. 2)

That the condition of Equation (1) accords with the bisecting angle theory mentioned above will be demonstrated below.

Assuming that the angle formed by the bisecting line of the field angle of the lens 4 with that of the lens 5 is $\omega$ and the angles formed by the beam of light projected from the lens 4 with he normal lines at the side ends of the screen 7 are $\beta_2$, $\beta_1$ as shown, the following Equation (2) holds from the nature of the bisection angle principle $$\omega = \frac{\beta_2 - \beta_1}{2} \tag{2}$$

where $\beta_2$ and $\beta_1$ satisfy the following Equations $$\beta_2 = \tan^{-1}\frac{H+W}{D}, \beta_1 = \tan^{-1}\frac{H-W}{D}$$

By Taylor approximation of the above Equations, the following Equations (3) and (4) are obtained.

$$\begin{cases} \beta_2 \approx \tan^{-1}\frac{H}{D} + \frac{\frac{W}{D}}{1+\left(\frac{H}{D}\right)^2} \\ \beta_1 \approx \tan^{-1}\frac{H}{D} - \frac{\frac{W}{D}}{1+\left(\frac{H}{D}\right)^2} \end{cases} \tag{3}$$

$$1 + \left(\frac{H}{D}\right)^2 = 1 + \tan^2\alpha = \frac{1}{\cos^2\alpha} \tag{4}$$

By substituting these equations for Equation (2), Equation (1) is obtained.

The above optical system was experimentally manufactured to minutely study the uniformity of white chromaticity spots. As a result, it was found that it has been remarkably improved as compared with the prior art, but some deviation remains. This state is conceptually shown in FIG. 3.

Figure 3:
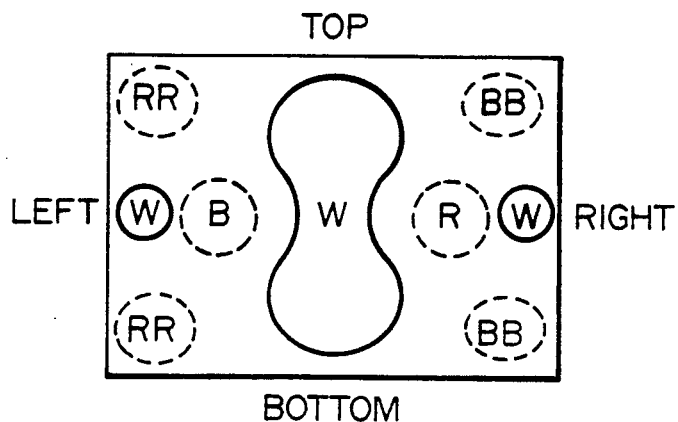
FIGS. 3 to 5 show several characteristics in the optical system corrsponding to FIG. 1, more specifically.
Figure 4:
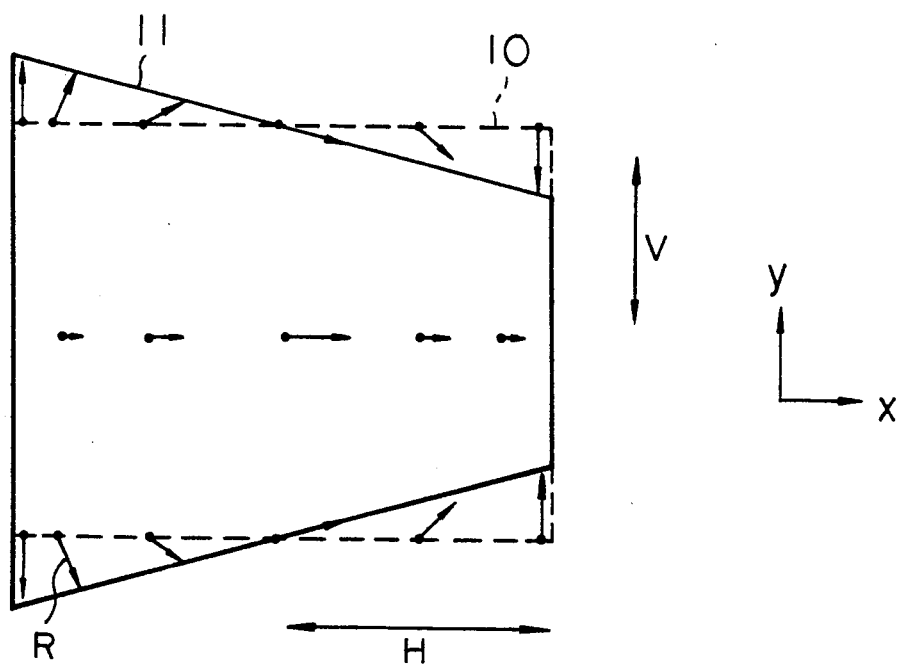

FIG. 3 shows the front view of the screen. The areas designated by W look purely white; the corner areas designated by RR (BB) look red (blue); and the mid-side area designated by R (B) looks slightly reddish (bluish). As is apparent, the corner areas RR (BB) have an opposite polarity with respect to the mid-side areas B(R). The cause of such residual white chromaticity deviation will be quantitatively analyzed and discussed below FIG. 4 shows the shape of an initial geometrical distortion on the screen which appears in the optical system of FIG. 1. In FIG. 4, dotted line 10 denotes the image on the screen corresponding to green; as can be seen, it is not accompanied with any distortion. More specifically, a rectangular original image provided to the green projection tube 2 appears as a rectangle on the screen 7. On the other hand, solid line 11 denotes the image on the screen corresponding to red. As can be seen, it is accompanied with trapezoidal projection distortion. This is because the optical axis of the lens 4 in the optical system of FIG. 1 is not in parallel to the normal line to the screen 7, but takes a finite convergence angle $\omega$ with it.

In FIG. 4, each of a number of arrows (vectors) R connecting the square (dotted line 10) with the trapezoid (solid line 11) indicates the distance and direction of deviation on the screen 7. If the deviation distance vector is represented by its components ($\Delta x$, $\Delta y$), the following Equation (5) holds in a projective geometry (x and y indicate coordinates on the screen with an origin located at the center of the screen). For each of the components ($\Delta x$, $\Delta y$), $$\begin{aligned} \Delta x &\approx \left(1+\frac{1}{M}\right)\omega \cdot t \cdot H\left(\frac{x^2}{H^2}-1\right) \\ \Delta y &\approx \left(1+\frac{1}{M}\right)\omega \cdot t \cdot V\frac{xy}{H\cdot V} \end{aligned} \tag{5}$$

where
M : the magnifying factor of an optical system,
t≡tan$\alpha$,

α: the field angle at left and right side ends on the screen,
H : a half image width
V : a half image height In the above Equation (5), the terms of 1/M results from the fact that a tilt angle of ω/M is provided between the CRT plane of each of the projection tubes for red and blue and the corresponding lens plane thereby to "correct the focusing plane". These terms, however, is generally as small as about 0.15 or less, so that they will be omitted in the following explanation In Equation (5), the term of $x^2$ included in the components $\Delta x$ is due to horizontal linearity distortion, and the term of $xy$ included in the component $\Delta y$ is due to trapezoidal distortion (vertical Keystone distortion). These geometrical distortions can be corrected by providing the images on the projection tubes for red and blue with geometrical distortions with an opposite polarity in the well known color misregistration correction circuit. In this way, the erroneous registration of an image on the screen can be deleted Attending on this, however, the direction of e.g. red light deviates by the angle components ($\Delta\Psi x$, $\Delta\Psi y$) indicated by the following Equations (6). $\Delta\Psi x$ and $\Delta\Psi y$ are the angle deviation components in a horizontal direction and a vertical direction, respectively (they are expressed in radian).

$$\Delta\Psi x \approx \frac{1}{D} \cdot \frac{\Delta x}{1 + \tan^2 \Psi x} \quad (6)$$

$$\Delta\Psi y \approx \frac{1}{D} \cdot \frac{\Delta y}{1 + \tan^2 \Psi y}$$

where $\Delta\Psi x$, $\Delta\Psi y$ are angles formed by a green light beam and a green optical axis.

The term of $(1+\tan^2)$ in Equation (6) is the differentiation coefficient of tan-1, and Similar to Equation (3).

Assuming that the oblique angle formed by the central light passing through a lens and its optical axis is $\Psi$, if there is no eclipse or shading of light due to a lens barrel, the relative optical transmission efficiency T of the lens will accord with the following $\cos^4$ theory $$T = \cos^4 \Psi$$

Since there is actually some eclipse of light due to the lens barrel, however, the above optical transmission efficiency can be approximately expressed by $$T \approx \cos^8 \Psi \quad (7)$$

Also, on the basis of the theory of a spherical angle, $$\cos\Psi = \cos\Psi x \cdot \cos\Psi y \quad (8)$$

The parameter to be noted in considering the fidelity of the reproduced white is the relative change in the light amount of each color; $\Delta T/T$, therefore:

$$\frac{\Delta T}{T} \approx \frac{\Delta \cos^8 \Psi}{\cos^8 \Psi} \quad (9)$$

$$= \frac{\Delta(\cos^8\Psi x \cdot \cos^8\Psi y)}{\cos^8\Psi x \cdot \cos^8\Psi y}$$

$$= 8 \cdot \Delta\Psi x \cdot \tan\Psi x + 8 \cdot \Delta\Psi y \cdot \tan\Psi y$$

Substituting Equations (6) and (5) for Equation (9), $$\frac{\Delta T}{T} \approx -8 \cdot \omega \cdot t \left\{ \frac{\frac{H}{D}\left(\frac{x^2}{H^2} - 1\right)}{1 + \tan^2 \Psi x} \tan\Psi x + \right. \quad (10)$$

$$\left. \frac{\frac{V}{D} \frac{xy}{HV}}{1 + \tan^2 \times \Psi x} \tan\Psi y \right\} \quad (10)$$

It should be noted that the sign of $\Delta x$ and $\Delta y$ has been inverted in the process of arriving at Equation (10) since as mentioned above, the distortion with an opposite polarity is provided. Using $X \equiv x/H$, and $Y \equiv y/V$ for normalized expression, at an upper right diagonal corner (X=1, Y=1), and $t = \tan\alpha H/D$, $$\tan\Psi x = \frac{x}{D} = \frac{H}{D} \frac{x}{H} = t \cdot X$$

$$\tan\Psi y = \frac{y}{D} = \frac{H}{D} \frac{V}{H} \frac{y}{V}$$

$$= t \cdot K \cdot Y$$

Considering K=V/H (aspect ratio), Equation (10) is transformed into $$\frac{\Delta T}{T} \approx -8 \cdot \omega \cdot t^3 \left\{ \frac{X^3 - X}{1 + t^2 \cdot x^2} + \frac{K^2 \cdot X \cdot y^2}{1 + t^2 \cdot K^2 \cdot y^2} \right\} \quad (11)$$

Equation (11) expressed the relative light amount distortion (change or deviation) of red and is hereinafter referred to as a skew-symmetric deviation or distortion. The distortion for blue can be obtained by inverting the sign of convergence angle ω, and hence the sign of Equation (11).

As a concrete example, substituting ω=0.1 rad, t=0.6 which corresponds to 31° in the horizontal field angle at the right end and K=¾ for Equation (11), the relative light amount distortion at the upper right corner (X=1, Y=1) is $$\left. \begin{array}{l} \frac{\Delta T}{T}(X = 1, Y = 1) \approx -0.08 \\ \text{(corresponding to about } -8\% \text{ at the corner)} \\ \frac{\Delta T}{T}\left(X = \frac{1}{\sqrt{3}}, Y = 0\right) \approx +0.06 \\ \text{(corresponding to about 6\% at amidsize area)} \end{array} \right\} \quad (12)$$

It should be understood that Equation (12) properly accords the skew-symmetric distortion phenomenon described in connection with FIG. 3, for example at the upper right corner, red weakens whereas blue strengthens.

As a result, the value of the relative light amount deviation expressed by Equation (12), i.e. the white chromaticity deviation will be greatly reduced as compared with the system of FIG. 2. This will be demonstrated below.

The deviation distance vector ($\Delta x$, $\Delta y$) corresponding to Equation (5) obtained for red is written by $$(\Delta x, \Delta y) = (W, 0) \quad (5)'$$

where W is a lens interval.

After having inverted the sign thereof in order to compensate for it, if Equation (5)' is substituted for Equations (6) and (9), the relative light amount deviation is $$\frac{\Delta T}{T} \approx \frac{-8 \cdot W \tan \Psi x}{D(1 + \tan^2 \Psi x)} \quad (11)'$$

$$\approx \frac{-8 \cdot \omega_0 \cdot t \cdot X}{1 + t^2 \cdot x^2}$$

As an example, if $\omega = 0.1$ rad and $t = 0.6$ (corresponding to $\alpha$ value of 31°) are substituted for Equation (1), since $\omega_0 = (1 + t^2) \omega = 0.136$ rad, $$\frac{\Delta T}{T}(X = 1) = -0.48 \quad (12)'$$

(corresponding to about $-48\%$)

It can be understood that the white chromaticity deviation expressed by Equation (12) according to the present invention has been reduced to about 1/6 of that expressed by Equation (12)' according to prior art FIG. 2.

Figure 5:
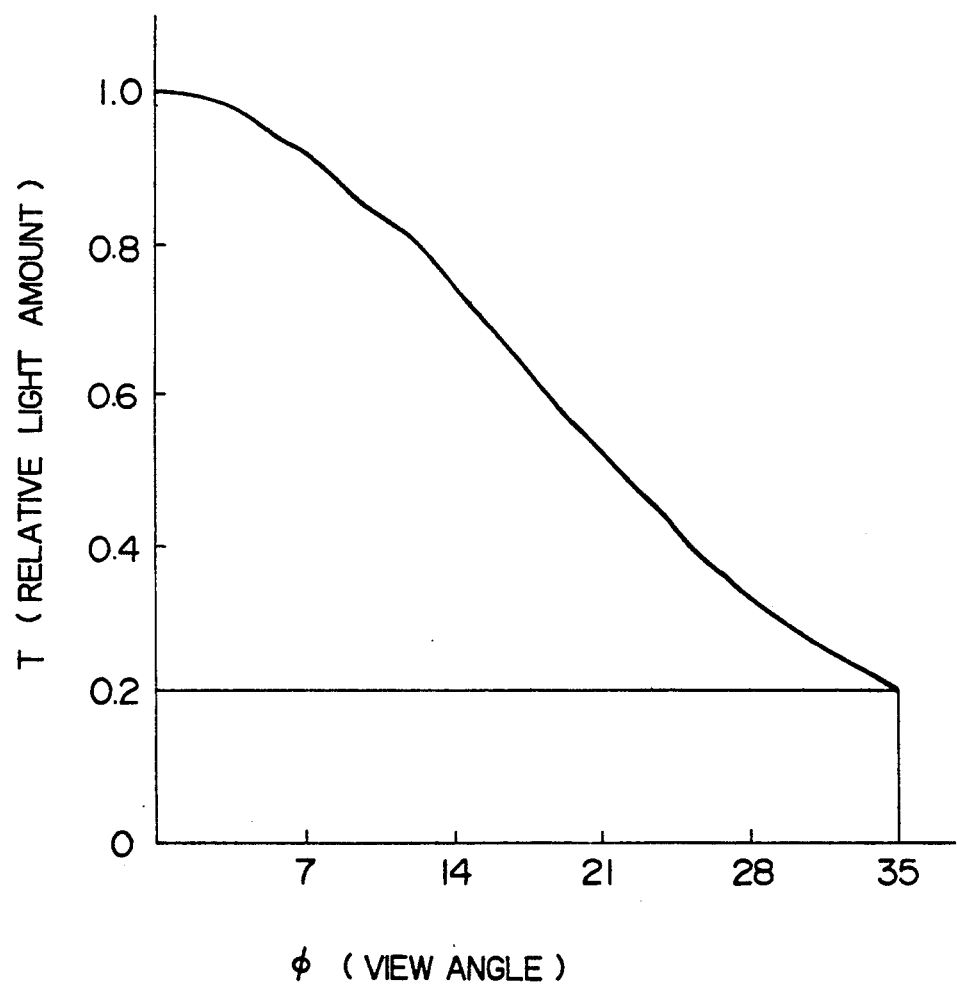

Additionally, the characteristic of the relative optical transmission efficiency T vs. the view angle $\Psi$ in the supposed lens expressed by Equation (7) is shown in FIG. 5. This considerably approximates to that of a lens actually used.

Thus, it can be concluded that in order to compensate for the white chromaticity deviation, the relative intensities of red and blue should be corrected in accordance with the value expressed by Equation (11).

To this end, three techniques which will be explained below can be utilized.

The first technique is an optical method (first embodiment) in which a transmittance modulation sheet is inserted in the neighborhood of the surface of the projection tubes in the space between the projection tube and the corresponding lens in the optical system of FIG. 1. The light transmittance of the sheet is previously set to provide the pattern expressed by Equation (11) as a function of coordinate points. The same sheet may be used in its turned-over state in right and left for red and blue. The light transmittance is not necessarily required to be continuously modulated, but may be discontinuously modulated by only distributing the densities of minute black or gray dots D1 on a transparent substrate 12A in accordance with Equation (11).

Figure 6:
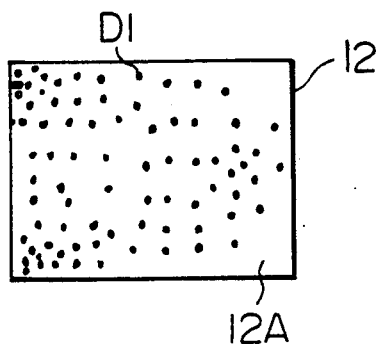
FIG. 6 is a view showing a transmittance modulation sheet used in an embodiment of the present invention.

An example of such a sheet 12 for red is shown in FIG. 6 (Embodiment 2). this sheet has the densities of spots of black or gray distributed in accordance with Equation (11).

Figure 7:
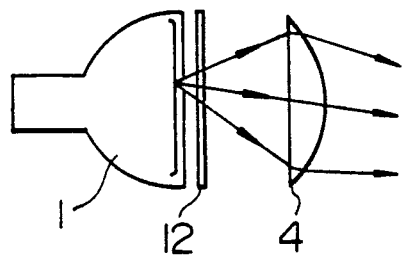
FIG. 7 is a view showing the location of the transmittance modulation sheet.

The sheet 12 is located as shown in FIG. 7. As seen from FIG. 7, the beam of light is not focused on the sheet 12. Therefore, the arrangement of dots shown in FIG. 5 does not impede the image on the screen.

The second technique is an electrical method in which the gain of a red signal amplifier and a blue signal amplifier is modulated in accordance with Equation (11). This is shown in FIG. 8 as a third embodiment of the present invention.

Figure 8:
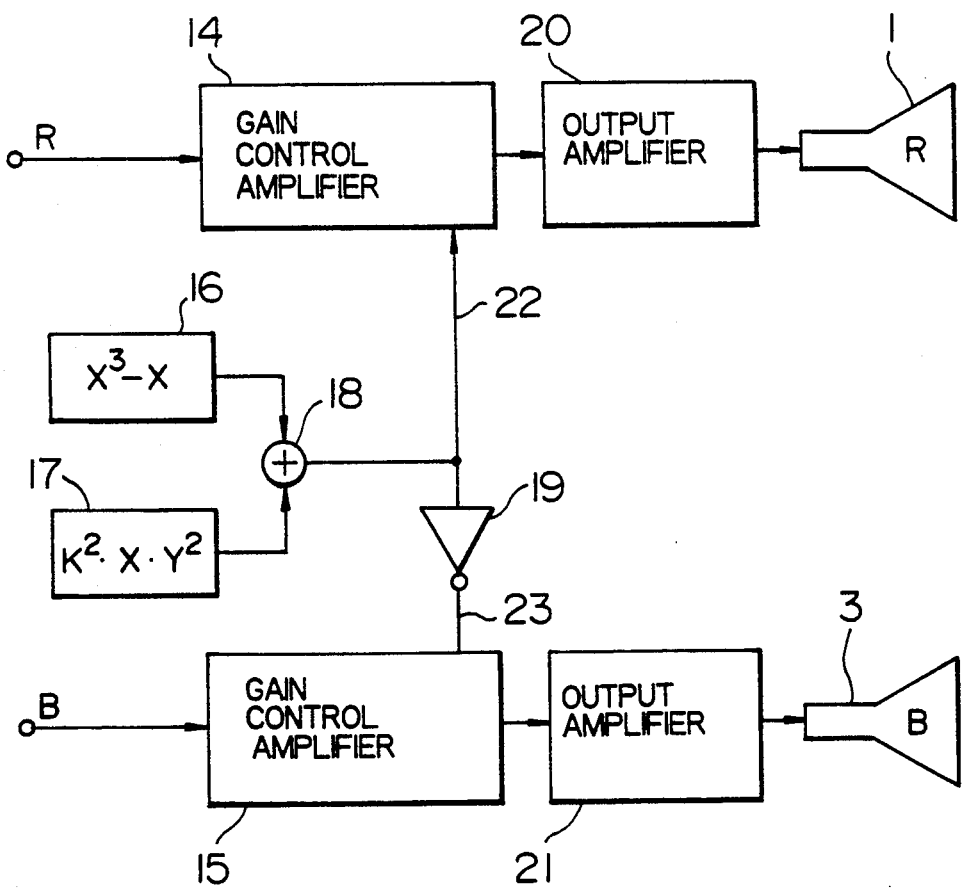
FIGS. 8 and 9 are circuit block diagrams of other embodiments of the present invention.

In FIG. 8, item 1 is a red projection tube; item 2 is a blue projection tube; and item 14 is a gain control amplifier for a red signal which may be a well known analog multiplier circuit or digital multiplier circuit. The output from the control amplifier 14 is applied to the control electrode of the projection tube 1 through an output amplifier 20. Items 15 and 21 are a gain control amplifier and an output amplifier for blue, respectively. They serve in the same manner as amplifiers 14 and 20.

Item 16 is a circuit for generating a $(X^3 - X)$ signal. This signal can be generated in such a manner that a saw-tooth wave X with a horizontal scanning period is processed in a square circuit (not shown) to provide $X^2$, $(X^2 - 1)$ is calculated in a subtraction circuit (not shown), and finally $(X^2 - 1)X$ is calculated in a multiplier circuit (not shown). The signal thus formed has an S shape, and so is referred to as an S waveform.

Item 17 is a circuit for generating a $K^2 \cdot XY^2$ signal which can be generated by multiplying a parabolic wave $Y^2$ with a vertical scanning period by the above X in a multiplier circuit (not shown). The signal thus formed has a shape of butterfly, and so is referred to a butterfly waveform.

Item 18 is an adder circuit and 19 is a phase inversion circuit. The amplifiers 14 and 15 carry out the correction operation substantially in accordance with Equation (11). The $(X^3 - X)$ signal generation circuit 16, the correction effect due to which is considerably smaller than that due to the $K^2 \cdot XY^2$ signal generation circuit 17, may be removed.

In the above explanation the factors of $(1 + t^2 \cdot X^2)$ and $(1 + K^2 \cdot t^2 \cdot Y^2)$ which are denominators were omitted; without these factors, the correction can be substantially realized by slightly decreasing the amplitude of the modulation signals 22 and 23 to be supplied to the gain control amplifiers 14 and 15 in FIG. 8. This is because the value of $t^2 \cdot X^2$ is much smaller than 1 at the diagonal corners of the screen Incidentally, the S waveform generated by circuit 16 in FIG. 8 can be obtained by integrating the saw-tooth wave X twice instead of using a multiplier. Also, in place of the gain control amplifier 15 for a blue signal is controlled, a circuit for controlling the light emitting efficiency (lm/W) of blue phosphors may be used. Generally, the light emitting efficiency of blue phosphors deteriorates as their focusing is made sharp; it can be controlled by controlling the focusing power of an electron gun.

Figure 9:
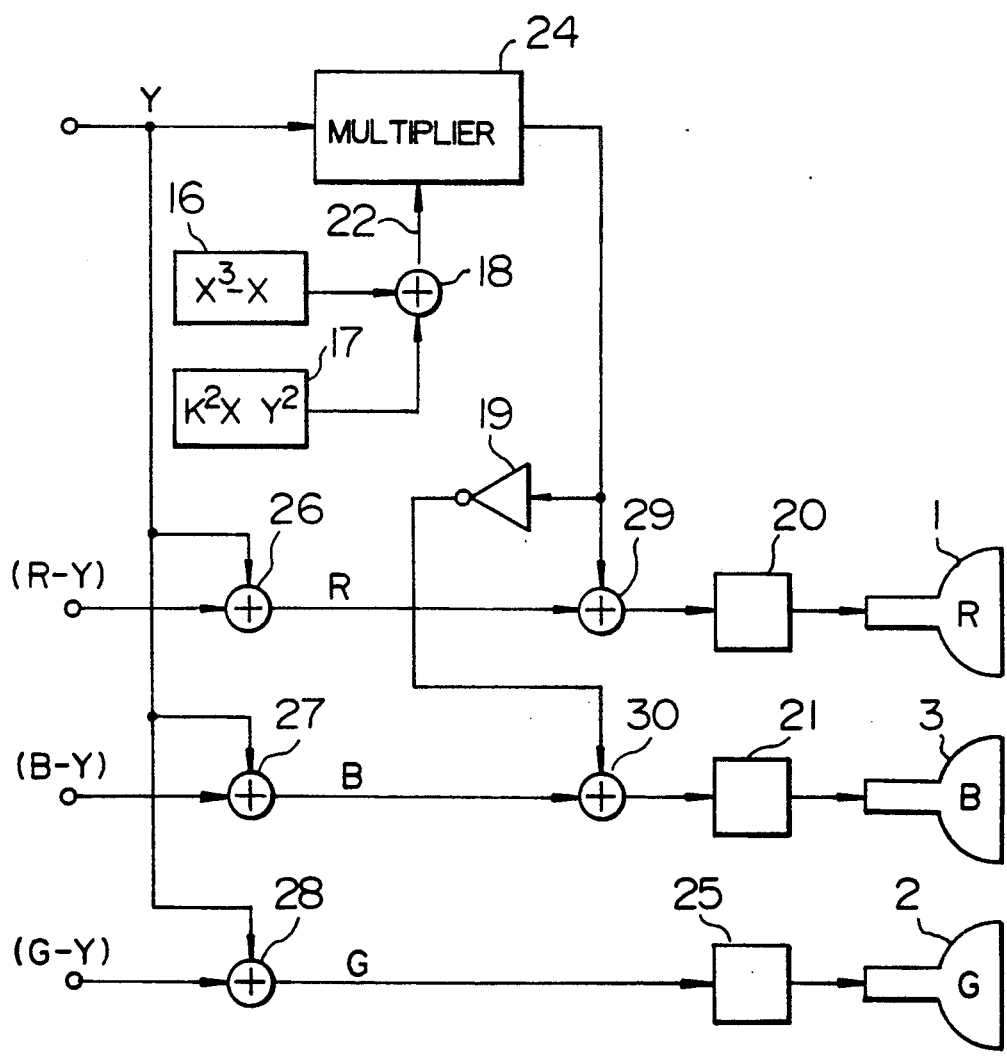

The third technique for compensating for the white chromaticity deviation is an electrical method in which the gain of a luminous signal This method, however, is suitable to a signal format of using a luminous signal Y and color difference signals $(R-Y)$, $(B-Y)$ and $(G-Y)$. This method is shown in FIG. 9 as a fourth embodiment of the present invention. In FIG. 9, the parts having the same function as in FIG. 8 are indicated by like reference numerals. Item 24 is a multiplier which multiplies the luminous signal Y by a correction control signal 25 is a green output amplifier circuit and items 26 to 30 are adders. The circuit operation of FIG. 9 can be inferred from that of FIG. 8. The arrangement of FIG. 9 enables red and blue to be controlled using one multiplier.

Figure 10A:
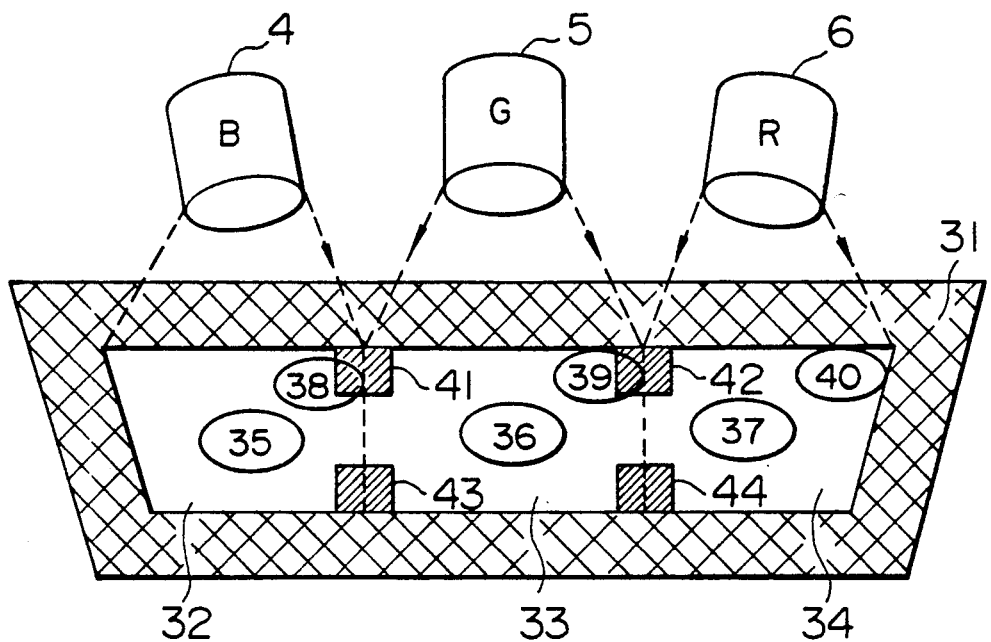
FIGS. 10A and 10B are a perspective view and a front view of a still other embodiment of the present invention.
Figure 10B:
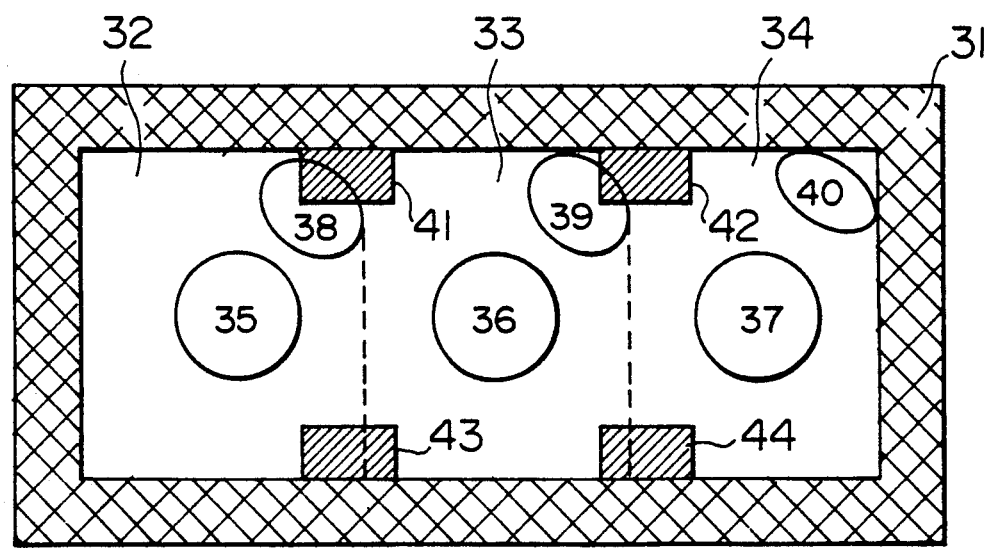

Finally, a modification of the correction means using the optical technique is shown in FIGS. 10A and 10B as a fifth embodiment; FIG. 10A is a perspective view viewed from the screen direction and FIG. 10B is a front view viewed from the screen direction.

Prior to explaining this embodiment in detail, taking into consideration the fact that the denominator of Equation (11) is approximately 1, an approximation sketch of the relative light amount distortion $\Delta T/T$ is provided:

$$\frac{\Delta T}{T} \approx -8 \cdot \omega \cdot t^3 \cdot X \cdot \left( X^2 + \frac{V^2}{H^2} Y^2 - 1 \right) \quad (20)$$

Any light amount distortion disappear at the areas where the above equation is zero. The condition for this is X=0 (on the central vertical line on the screen) or $$X^2 + \frac{V^2}{H^2} Y^2 = 1 \quad (21)$$

Figure 11:
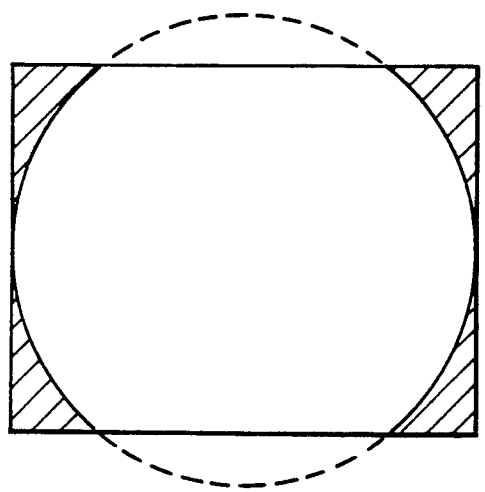
FIG. 11 is a view for explaining the principle of the embodiment of FIGS. 10A and 10B.

The locus expressed by Equation (21) is a circle having the horizontal width of the screen as a diameter. The diagonal corners outside the circle provide abruptly increased light amount distortions. Such areas are shown as shades portions in FIG. 11; they correspond to the diagonal corners in FIG. 3. Also, the diameter of the circle expressed by Equation (21) increases or decreases according as the intersecting point of the optical axes of the lenses in FIG. 1 approaches or leaves the screen.

Next, the details of this embodiment will be explained below with reference to FIGS. 10A and 10B. In FIGS. 10A and 10B, items 4, 5 and 6 are projection lenses for blue, green and red. Item 31 is a plane at a position apart from the projection lenses by about several cm's in the travelling directions of the projected light beams. The projected light exists at the double hatched area at the periphery of the plane but passes through the non-hatched area at the inside portion on the plane.

Items 35, 36 and 37 are circular areas where the projection light cones for blue, red and green corresponding to the central portion of the screen intersect with the plane 31, respectively; each, therefore, represents the section of the cone formed by connecting a point at the central portion of the screen with the exit pupil of each projection lens.

Items 38, 39 and 40 are light passing areas corresponding to the upper right corners of the screen. They are semicircular owing to the eclips vignette of light due to each lens barrel. Items 41, 42, 43 are light shading plates which are principal elements in this embodiment.

At the upper right corner, it is necessary to strengthen red and weaken blue in accordance with Equation (11). Unlike the manner of amplifying an electrical signal, however, it is impossible to strengthen red by the light shading plate In place of strengthening red, therefore, it is proposed to weaken green by the amount corresponding to Equation (11) and weaken blue by twice the amount corresponding to Equation (11). In this way, it is possible to correct the purity derioration (i.e. color imbalance) at the upper right corner. To this end, light shading plates 41 and 43 are arranged at the positions slightly displaced from the mid point between 35 and 36 toward 35 for blue. Likewise, light shading plates 42 and 44 are arranged at positions displaced from the mid point between 36 and 37 toward 37 for red.

The shape of the light shading plates is not necessarily required to be rectangular but may be triangular or circular as long as their area is selected so that the area shading rate is substantially once or twice the amount defined by Equation (11). Further, in the case where light is projected on the screen in such a manner that its projection path is bent by a mirror located immediately before the projection lens, the light shading plate may be partially arranged on the mirror.

The embodiments described above can be used not only individually but also in combination. For example, in FIG. 10, the light shading plate may used for only the projection lens for red whereas the focusing control means may be used for the blue light using the saturation property of blue phosphors mentioned above.

Thus, the several embodiments of the present invention have been explained. Several modifications will be explained below.

The present invention has been heretofore disclosed in connection with the optical system in which line, but it may be applied to a vertical in-line arrangement. Specifically, this can be done by exchanging X for Y.

Meanwhile, the white chromaticity deviation is mainly due to the deviation in the relative optical transmission efficiency of the lens as mentioned above; it, however, is also secondarily due to the relative optical transmission efficiency of the screen. The compensation for this can be made by slightly modifying the previously described apparatus. Further, although the manner of correction was described in connection with the white chromaticity, it can also be used to correct the luminance deviation for red, green and blue using the property of Equation (7). This technique is valuable in some application fields.

Figure 12:
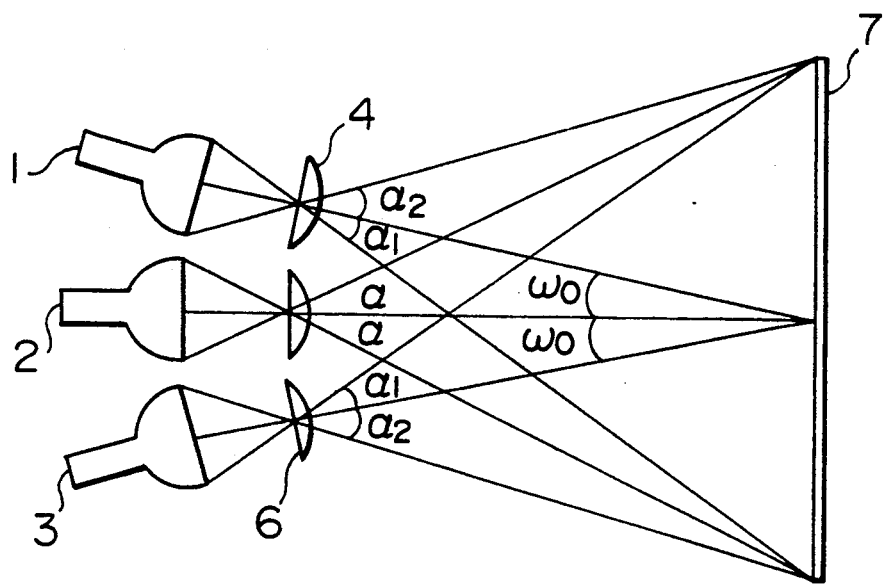
FIG. 12 is a horizontal sectional view of another optical system of the display according to the prior art.

Finally, differences in the effect between the optical system shown in FIG. 12 which is one of the prior arts and the basic arrangement of the present invention shown in FIG. 1 will be explained briefly In FIG. 12, the optical axes of the lenses 4, 5 and 6 are converged on the center position of the screen; the convergence angle is $\omega_o$. The deviation vector $(\Delta x, \Delta y)$ in this optical system is, in place of Equation (5), $$(\Delta x, \Delta y) \approx \omega_o \cdot t \left( \frac{X^2}{H} \cdot \frac{xy}{H} \right) \quad (5)''$$

After having arrived at Equations (6) and (9) as mentioned above, the equation corresponding to Equation (11) is $$\frac{\Delta T}{T} \approx -8 \cdot \omega \cdot t^3 \left( \frac{X^3}{1 + t^2 \cdot X^2} + \frac{K^2 \cdot X \cdot Y^2}{1 + t^2 \cdot K^2 \cdot Y^2} \right) \quad (11)''$$

If the value of Equation (11)'' is calculated for the right upper diagonal corner (X=1, Y=1) by substituting $\omega_o=0.136$ and t=0.6, $$\frac{\Delta T}{T} (X = 1, Y = 1) \approx -0.28$$

(corresponding to about −28%)

It should be noted that the value of Equation (12) is of the present invention conveniently as small as about ⅓ or less of the above Equation (12)'' of the prior art arrangement.

Thus, the means for correcting the white chromaticity deviation in a projection display with plural projection tubes has been explained.

The present invention can be applied to a light valve type projection display having plural display panels, in the manner as mentioned below. The conventional technique of the light valve is to use light valves in place of the projection tubes in FIGS. 2, 10A and 10B. The arrangement of FIG. 1 is also efficient to the light valve type projection display. In addition to the components as shown in FIG. 3, the white chromaticity deviation intrinsic to the light valves will occur.

In the case of the projection tube type, the red image on a screen, which is in an initial trapezoidal distortion state as indicated by the solid line 11 in FIG. 4, provides a higher luminance on the right side of the screen because it is compressed thereat; on the other hand, the red image provides a lower luminance on the left side of the screen because it is expanded thereat. Such an unbalance in the chromaticity is spontaneously corrected or removed because the power of the electronic beam per an unit area on the luminescent surface of the projection tube varies in accordance with the registration correction as previously mentioned. As. a result, only the white chromaticity deviation as shown in FIG. 3 remains.

On the other hand, in the light valve type projection display, the luminance of the red image on the right side, which is in an initial trapezoidal distortion state, is the same as that on the left side, before registration correction, which is different from the projection tube type projection display. Therefore, the registration correction causes white imbalance which is unique to the light valve system. This is because the light amount per an unit area on the image surface of the light valve is regardless of the registration correction as well known. The unbalance in the chromaticity of red and blue on the left and right sides, which is intrinsic to the light valve type projective display, provides the white chromaticity deviation that the image on the screen is bluish on the right side and reddish on the left side.

The difference $\Delta R/R$ in the chromaticity on the left and right sides of the red image can be quantitatively expressed by $$\frac{\Delta R}{R} = -\mathrm{div}(\Delta x, \Delta y) = -\frac{d\Delta x}{dx} - \frac{d\Delta y}{dy} \tag{22}$$

where $(\Delta x, \Delta y)$ is a deviation distance vector expressed by Equation (5).

Substituting Equation (5) for Equation (22), $$\frac{\Delta R}{R} \approx \left(1 + \frac{1}{M}\right)\omega t\left(\frac{2x}{H} + \frac{x}{H}\right) \approx \omega t \frac{3x}{H} \tag{23}$$

For example, when $\omega = 0.1$ rad, and $t = 0.6$ (which corresponds to 31° field angle at the left and right side ends), $$\text{screen right end: } X = H \rightarrow \frac{\Delta R}{R} = 0.18$$

$$\text{screen left end: } X = -H \rightarrow \frac{\Delta R}{R} = -0.18$$

Thus, the relative deviation of 18% results. Likewise, the blue image provides the relative deviation with an opposite polarity and an equal amount.

The white chromaticity deviation intrinsic to the light valve type projection display is only proportional to a horizontal coordinate x for both ends of the screen as expressed by Equation (23).

Therefore, by adopting the same means as in the projection tube type projection display on the basis of the above equation, the present invention can be applied to a light valve type projection display.

In accordance with the present invention, the white chromaticity deviation which was problematic in the prior art can be greatly reduced (about ⅓ or less) by simple means; the color fidelity thereof, therefore, also can be improved. The present invention, which can expand the application field of a projection display, is of great industrial value.

I claim:

1. A projection display of the type which projects respective images emitted from a plurality of projection tubes on a rectangular display screen through lenses arranged correspondingly to the projection tubes, thereby to compose the images by overlapping, wherein the lenses are arranged so that a respective optical axis is located on a center line substantially bisecting an angle at which a pupil of each of the lenses sees both side ends of the rectangular screen with an equal field angle, thereby preventing white chromnaticity deviation from occurring at said ends of the screen, said lenses being arranged so that skew-symmetric white chromaticity deviations remain at the diagonal corners of the screen and at mid-side areas of the screen, a polarity of the skew-symmetric white chromaticity deviations at the diagonal corners of the screen being opposite to a polarity of the skew-symmetric white chromaticity deviations at the mid-side areas of the screen.

2. A projection display according to claim 1, further comprising relative light amount deviation correction means including:

correction signal generation means for generating $XY^2$ as a correction signal, X being an odd power component of a coordinate of a scanning position in one coordinate direction along a scanning direction on the display screen, $Y^2$ being an even power component of a coordinate of the scanning position in an other direction intersecting the one coordinate direction at right angles, and signal amplificiation means for amplifying one of an original color signal and a luminance signal and having an amplification gain thereof controlled by the correction signal from said correction generation means.

3. A projection display according to claim 1, further comprising relative light amount correcting means including:

a first $(X^3-X)$ signal generating circuit;

a second $(X \cdot Y^2)$ signal generating circuit;

adder circuit means for adding outputs from said first and second signal generating circuits;

means for receiving an output from said adder circuit means to control a color signal for one color;

a projection tube for receiving an output from the means for controlling the color signal for the one color;

phase inverting means for phase-inverting the output from said adder circuit means;

means for receiving an output from said phase inverting means to control a color signal for an other color; and another projection tube for receiving an output from the means for controlling teh color signal for the other color;

wherein X and $X^3$ are odd power components of a coordinate of a scanning position in one coordinate direction along a scanning direction on the display screen and $Y^2$ is an even power component of a coordinate of the scanning position in another direction intersecting the one coordinate direction at right angles.

4. An projection display according to claim 1, further comprising relative light amount deviation correcting means including:

($X^3 - X$) signal generating circuit;

a second $X \cdot Y^2$ signal generating circuit;

an adder circuit means for adding outputs from said first and second signal generating circuits; and multiplication means for multiplying an output from said adder circuit means by a luminance signal;

wherein X and $X^3$ are odd power components of a coordinate of a scanning position in one corrdinate direction along a scanning direction on the display screen and $Y^2$ is an even power component of a coordinate of the scanning position in another direction intersecting the one direction at right angles.

5. A projection display according to claim 1, further comprising light shading means arranged on optical paths between the projection tubes and the projection lenses.

6. A projection display according to claim 1, further comprising light shading means arranged on optical paths between the projection lenses and the screen.

7. A projection display according to claim 1, further comprising light shading means comprises two sheets each of which a transparent plate on which one of black and gray minute dots are distributed with a predetermined density.

8. A projection display according to claim 1, further comprising relative light amount deviation correcting means including light shading means for said diagonal corners of said screen, said light shading means being arranged on optical paths between the projection tubes and the screen.

9. A projection display according to claim 8, wherein said light shading means is located at a predetermined position to decrease the light transmission rate by a predetermined rate for a predetermined color.

10. A projection display according to claim 1, wherein the lenses are arranged so that optical axes thereof converge at a position other than at the screen.

* * * * *